US012650500B2

(12) United States Patent
Sergeev et al.

(10) Patent No.: US 12,650,500 B2
(45) Date of Patent: Jun. 9, 2026

(54) VERIFICATION OF THE FUNCTIONALITY OF A LASER SCANNER

(71) Applicant: Valeo Schalter und Sensoren GmbH, Bietigheim-Bissingen (DE)

(72) Inventors: Nikolai Sergeev, Bietigheim-Bissingen (DE); Daniel Thiel, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 618 days.

(21) Appl. No.: 18/036,536

(22) PCT Filed: Nov. 8, 2021

(86) PCT No.: PCT/EP2021/080903
§ 371 (c)(1),
(2) Date: May 11, 2023

(87) PCT Pub. No.: WO2022/101125
PCT Pub. Date: May 19, 2022

(65) Prior Publication Data
US 2023/0408658 A1 Dec. 21, 2023

(30) Foreign Application Priority Data
Nov. 11, 2020 (DE) ..................... 10 2020 129 663.0

(51) Int. Cl.
*G01S 7/497* (2006.01)
*G01S 17/931* (2020.01)
(52) U.S. Cl.
CPC ............. *G01S 7/497* (2013.01); *G01S 17/931* (2020.01)

(58) Field of Classification Search
None
See application file for complete search history.

(56) References Cited

FOREIGN PATENT DOCUMENTS

DE 102018110566 A1 11/2019

OTHER PUBLICATIONS

International Search Report and Written Opinion in corresponding International Application No. PCT/EP2021/080903, dated Feb. 24, 2022 (19 pages).
German Search Report in corresponding German Application No. 10 2020 129 663.0, dated Aug. 30, 2021 (5 pages).

*Primary Examiner* — Hovhannes Baghdasaryan
(74) *Attorney, Agent, or Firm* — Osha Bergman Watanabe & Burton LLP

(57) ABSTRACT

A method for verifying the functionality of a laser scanner includes a housing with a light-permeable window, a transmission unit inside the housing, a deflection unit, and a detector unit inside the housing. At least one test signal is transmitted by the transmission unit during a test phase. The deflection unit is oriented so that the at least one test signal is not directed to the window. Components of the at least one test signal are detected by the detector unit, and based on this detection, at least two detector signals are generated. A pulse width is ascertained for each of the detector signals by a computing unit, and a ratio of the pulse width of a first detector signal to the pulse width of a second detector signal is ascertained. The operability of the transmitter unit and/or the detector unit is verified on the basis of said ratio.

15 Claims, 3 Drawing Sheets

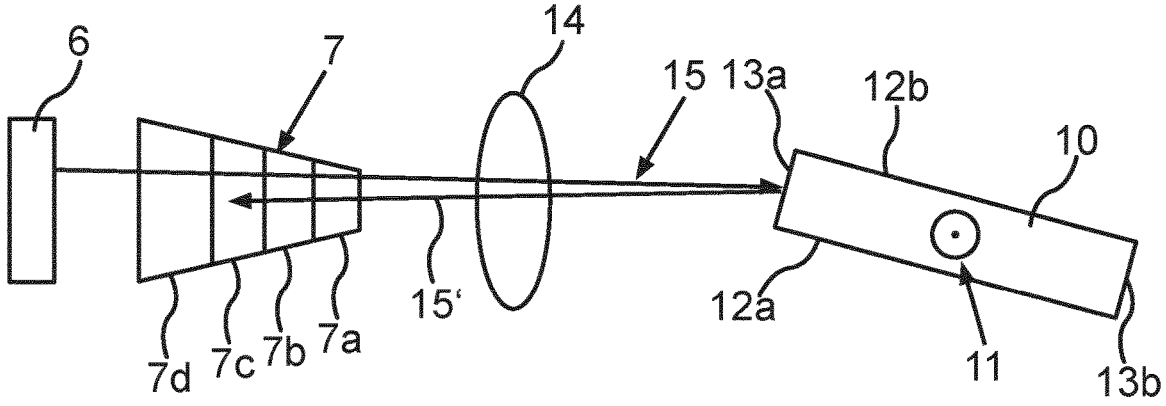
Fig.5
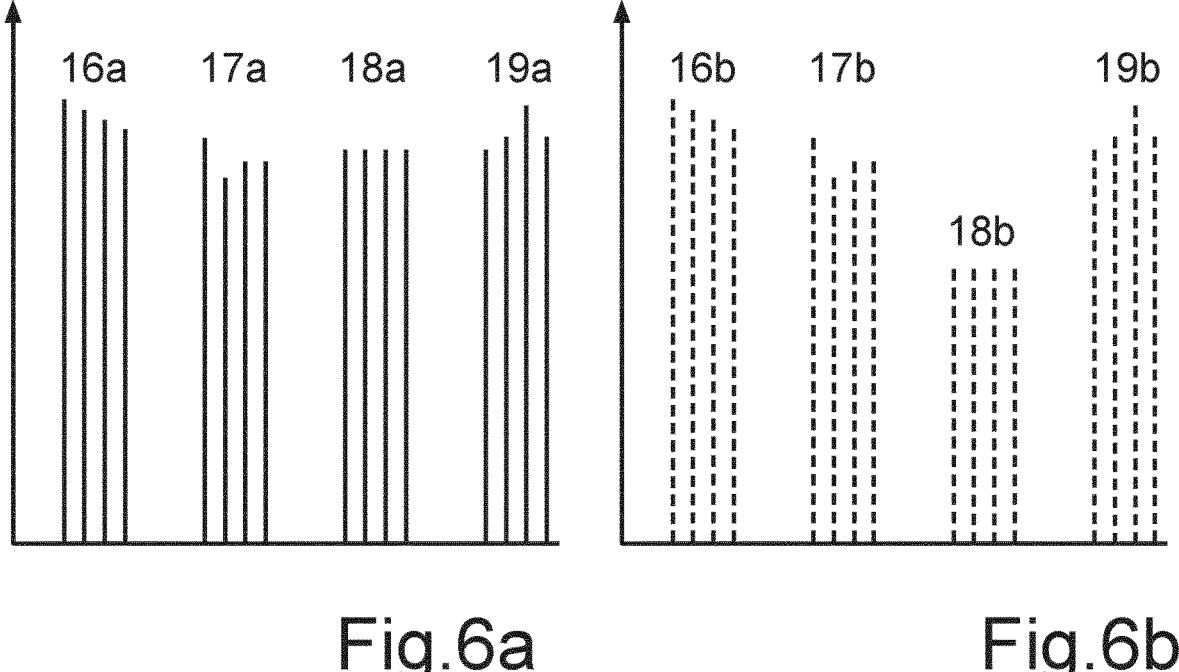
Fig.6a                    Fig.6b

VERIFICATION OF THE FUNCTIONALITY OF A LASER SCANNER

The present invention relates to a method for checking the function of a laser scanner, which a housing with a light-transmissive window, a transmitter unit for emitting laser signals which is arranged within the housing, a movable deflection unit for deflecting the laser signals, and a detector unit arranged within the housing, wherein at least one test signal is transmitted by means of the transmitter unit during a test phase, the deflection unit is aligned vis-à-vis the transmitter unit during the test phase so that the at least one test signal is not directed at the window. The invention also relates to a corresponding laser scanner device having a computing unit and a laser scanner, a motor vehicle having a laser scanner device, and a computer program product.

Lidar systems may be fitted on motor vehicles in order to realize various functions of electronic vehicle guidance systems or driver assistance systems. These functions include distance measurements, distance control algorithms, lane keeping assistants, object tracking functions, and so on.

A known design of lidar systems are so-called laser scanners, in which a laser beam is deflected by means of a deflection unit, with the result that different deflection angles of the laser scanner can be realized. The emitted laser beams can be partially reflected or scattered in the surround, and scattered or reflected components can in turn partly impinge on the laser scanner, in particular on a detector unit of the laser scanner, which can generate corresponding detector signals on the basis of the detected components. The transmitter unit of a laser scanner contains one or more laser light sources and the detector unit contains one or more optical detectors, for example photodiodes.

The maximum range of the laser scanner is of great importance, in principle and especially in the automotive context. The functionality and in particular the maximum range of a laser scanner can be caused, for example, by the contamination of the light sources or optical detectors. For example, the contamination can be traced back to dust particles that arise during the manufacturing process. Such dust particles can partially cover the light source or the optical detector and thus reduce the range of the laser scanner. In principle, contaminations can be identified by tests at the end of the manufacturing process, for example. However, it is possible that the contaminations only arise after the test or that contaminations already present before the test only cover the light source or the optical detector after the test.

Document DE 10 2018 110 566 A1 describes a method for checking the functionality of a laser scanner. In this case, a light signal is transmitted by means of a transmitter of the laser scanner, while a rotatable or pivotable deflection mirror unit is aligned in such a way that light signals coming from the transmitter cannot be directed at a window as the housing of the laser scanner. The light signal scattered within the housing is received by the receiver and compared to a reference. Depending on a result of the comparison, a notification regarding the functionality of the laser scanner is optionally generated.

A disadvantage of this method is that the functionality of the laser scanner can only be checked in a very non-specific manner, and so if functional impairments are detected, they cannot be specified in more detail.

Against this background, it is an object of the present invention to specify an improved concept for checking the function of a laser scanner, by means of which functional limitations of the laser scanner can be recognized more specifically.

This object is achieved by the respective subject matter of the independent claims. Advantageous developments and preferred embodiments are the subject matter of the dependent claims.

The improved concept is based on the idea of determining a pulse width for each corresponding detector signal in a laser scanner whose detector unit contains at least two optical detectors, and of relating the pulse widths of different detector signals or detectors to one another in order to check the functionality.

According to the improved concept, a method for checking the function of a laser scanner is specified. The laser scanner has a housing with a light-transmissive window and a sensor for emitting laser signals which is arranged within the housing. The laser scanner also has a movable deflection unit for deflecting the laser signals and a detector unit which is arranged within the housing and has at least two optical detectors. According to the method, at least one test signal is transmitted by means of the transmitter unit during a test phase. During the test phase, the deflection unit is aligned vis-à-vis the transmitter unit, in particular by means of a control unit of the laser scanner, so that the at least one test signal is not directed at the window, especially by means of the deflection unit.

Components of the at least one test signal, in particular reflected and/or scattered components, are recorded by means of the at least two optical detectors and at least two detector signals are generated by the at least two optical detectors on the basis of the recorded components. A pulse width is determined by means of a computing unit, in particular by means of a computing unit of the laser scanner or by means of a computing unit coupled to the laser scanner, for each of the at least two detector signals and a ratio of the pulse width of a first detector signal of the at least two detector signals to the pulse width of a second detector signal of the at least two detector signals is determined. A functionality of the transmitter unit and/or detector unit is checked on the basis of the ratio, in particular by means of the computing unit.

Here and below, the term "light" may be understood as comprising electromagnetic waves in the visible range, in the infrared range, and/or in the ultraviolet range. Accordingly, the term "optical" may also be understood as relating to light in this sense. The laser signals and the test signal preferably correspond to light in the infrared range.

The light-transmissive window of the housing is, in particular, light-transmissive for light that can be emitted by means of the transmitter unit, in particular in the form of the laser signals or the test signal. Apart from the window, the housing can be opaque, for example.

The laser signals and the at least one test signal each correspond to laser signals that can be emitted by means of one or more light sources of the transmitter unit, in particular laser light sources, for example laser diodes. In particular, the at least one test signal can be viewed as a special case of the laser signals, specifically as a laser signal of the kind emitted during the test phase. Nevertheless, the test signals can also be generated and emitted with a specially adapted spectral composition or structure or any other composition or structure, which may differ from other laser signals that are generated and emitted outside of the test phase. This is not mandatory, however.

The detector unit, in particular the at least two optical detectors, is or are configured to detect reflected or scattered components of the laser signals and of the at least one test signal. If the laser signals are emitted through the light-transmissive window into the surround of the housing, then components of the laser signal that are reflected or scattered outside the laser scanner or housing, for example, can re-enter the housing and can subsequently be detected. In the case of the at least one test signal, components of the at least one test signal possibly reflected and/or scattered multiple times within the housing, in particular, are detected by the at least two optical detectors. In particular, the at least one test signal essentially does not leave the housing of the laser scanner as a result of not being directed at the window.

The at least one test signal not being directed at the window can be understood in particular on the basis of a ray-optical understanding or an understanding in keeping with geometric optics.

Each optical detector of the at least two optical detectors generates, in particular, an associated detector signal of the at least two detector signals on the basis of the components recorded by the respective optical detector. Depending on the specific embodiment of the laser scanner, the at least two optical detectors can be configured differently. The at least two optical detectors preferably each contain a photodiode, for example an avalanche photodiode, APD. The time profile of one of the detector signals therefore reflects the time profile of the number of photons that impinge on a corresponding optically active surface of the respective optical detector.

In particular, the detector signals have signal pulses, which can also be referred to as echoes. The pulse width of a detector signal therefore corresponds in particular to a pulse width of a corresponding signal pulse. In this case, the pulse width is given by a period of time during which the amplitude of the corresponding detector signal assumes a value above a predefined limit value. This pulse width is also referred to as the echo pulse width, EPW.

In order to determine the ratio of the pulse width of the first detector signal to the pulse width of the second detector signal, the computing unit can, for example, form a quotient from the corresponding pulse widths.

Checking the functionality of the transmitter unit and/or detector unit can be understood in particular in the context of the ratio of the pulse widths to one another being used to check whether there is a limitation in comparison with a normal operation or an unlimited operation or an unlimited function of the transmitter unit and/or detector unit.

In particular, the number of photons impinging on the active surface of an optical detector affects the pulse shape of the corresponding signal pulse and thus affects the pulse width. If the pulse width under reproducible conditions, as are given during the test phase, therefore differs from what is expected for regular or unlimited operation, it is possible to deduce that the transmitter unit and/or the detector unit has a limited functionality. This may be caused, in particular, by the partial or complete coverage of a light source of the transmitter unit or of one of the optical detectors, that is to say, in particular, an active surface of one of the optical detectors.

If there is no functional limitation, then the value of the ratio of the pulse widths to one another has a specific value or a value determinable in advance. By way of example, this value can be determined within the scope of a calibration. If the active surface of the first optical detector, that is to say the active surface of the optical detector that generates the first detector signal, is now covered by a particle, then this optical detector detects fewer photons, which may lead to a reduced pulse width as a consequence. The value of the ratio therefore becomes smaller. By contrast, if the active surface of the second optical detector, that is to say the active surface of the optical detector that generates the second detector signal, is covered, then the value of the ratio becomes correspondingly larger. By analyzing the value of the ratio, in particular in comparison with a reference ratio determined during the calibration or otherwise, the computing unit is able to deduce functionality or a limitation of the functionality, in particular due to a contamination by particles as described. In addition, the computing unit can also use the ratio to determine which of the two optical detectors is covered in the example outlined.

Moreover, the size of the deviation of the value of the ratio from the value to be expected in the case of an unlimited function can allow a statement to be made as to how severe the functional limitation is, that is to say how severely the corresponding optical detector is covered by the particle. The greater the coverage, the fewer photons are detected by the corresponding optical detector and the smaller the pulse width becomes, which results in a correspondingly greater deviation of the ratio as a consequence.

Depending on the specific configuration of the laser scanner, individual optical detectors can be assigned to a specific light source of the transmitter unit, while other optical detectors are not assigned to this light source. This may be the case, in particular, if the transmitter unit has a plurality of light sources, with the result that different optical detectors are assigned to different light sources. In that case, the optical detectors assigned to a specific light source only record scattered or reflected components of light which is emitted by means of the corresponding assigned light source. This can be realized, for example, by a time-offset control of the emission of the laser signals or test signals by different light sources.

In such embodiments, a functional limitation of one of the light sources may possibly also be deduced from the ratio. By way of example, if a light source is covered by a particle or otherwise contaminated, this will affect the value of the pulse width ratio precisely when one of the optical detectors that generate the first or second detector signal is assigned to this light source.

As a result of the ratio of the pulse widths allowing conclusions to be drawn both about the optical detectors involved and the strength of the functional limitation or contamination, and possibly also allowing conclusions to be drawn about the associated light sources, the improved concept allows a more specific categorization or determination of the functional limitation.

An advantage of taking the ratio of the pulse widths into account lies in the invariance of this ratio in relation to other influencing variables, such as for example the optical radiant power with which the test signal is emitted by the transmitter unit, for example the optical laser output power, a bias voltage with which the optical detectors are operated, for example a blocking voltage with which the corresponding photodiodes or APDs are operated, an ambient temperature, a component temperature or ambient light.

As a result, the functionality can be assessed particularly reliably and reproducibly on the basis of the ratio.

According to at least one embodiment of the method for checking the function of a laser scanner according to the improved concept, checking the functionality includes comparing the ratio to a predefined reference ratio by means of the computing unit and generating an error signal, in particular by means of the computing unit, depending on a result of the comparison.

The reference ratio can be, in particular, the ratio of the pulse widths of the detector signals of the first and the second optical detector, respectively, at an earlier point in time, for example during a calibration procedure. The ratio can also be compared with the reference ratio, for example, by forming a quotient. If there is no deviation of the ratio from the reference ratio, then the quotient is accordingly equal to 1. Deviations of the quotient from 1, which in particular exceed a predefined tolerance value, indicate the limited functionality of the first or second optical detector or of an associated light source.

This simplifies the check of the functionality, since it is not the absolute value of the ratio that has to be evaluated, but rather its size in relation to its reference ratio.

In various embodiments, the reference ratio can also be updated or updated periodically, for example when the laser scanner is activated or deactivated. If, in particular, no significant impairment of the functionality of the transmitter unit and/or detector unit is determined, then the specific ratio of the pulse widths can be defined and stored as a new reference ratio. This allows effects caused by regular aging of the components, in particular of the optical detectors, to be compensated for.

According to at least one embodiment, a ratio of the pulse widths of the detector signals of a respective pair to one another is determined by means of the computing unit for each pair of detector signals of the at least two detector signals. The functionality is checked on the basis of the ratios of the pairs of detector signals, in particular on the basis of all ratios of the pairs of detector signals.

In the case of a total number of N optical detectors of the at least two optical detectors of the detector unit, there nominally are $N^2$ ratios, with these ratios also including ratios of the pulse widths of the various detector signals to themselves and an inverse ratio for each ratio. Accordingly, there are $N^2/2-N$ relevant values for corresponding ratios. However, depending on the type of processing and storage, it may be advantageous to represent the ratios in matrix form with $N^2$ entries. In this case, adjacent rows or columns in the matrix may advantageously correspond to optical detectors arranged physically next to each other, with the result that geometric effects are reflected in the matrix and are possibly thus more easily identifiable.

By taking the ratios of pulse widths for all pairs of detector signals into account, the functionality of the transmitter unit and the detector unit can be checked more comprehensively and reliably, since the contamination or other functional impairment of any one or more optical detectors or light sources can be traced.

According to at least one embodiment, checking the functionality includes the computing unit being used to compare each of the ratios with a respective predefined reference value or to normalize said ratios according to the predefined reference value and to check the functionality on the basis of the normalized ratios of the pairs of detector signals or on the basis of respective results of the comparisons.

With regard to the reference values for the ratios, the above statements apply analogously. In this case, the reference values for different pairs of detector signals can differ from one another. The normalization can be understood, for example, as forming the quotient of the respective ratio with the corresponding reference value.

According to at least one embodiment, checking the functionality includes identifying one of the at least two detector signals, in particular exactly one of the at least two detector signals, by means of the computing unit on the basis of the ratios or the normalized ratios, with the ratio of each pair containing the identified detector signal deviating by at least one predefined threshold value from the associated predefined reference ratio.

In other words, whether each ratio deviates from the reference ratio by at least the threshold value is determined for a detector signal of the at least two detector signals from the multiplicity of ratios of the pairs of detector signals. Should this be the case, it is possible to assume that the functionality of the optical detector which generates the identified detector signal is limited. This benefits from the fact that the probability of the functionality of a plurality of optical detectors being limited or significantly limited at the same time, for example due to contamination.

In the image of the matrix sketched above, the limitation of the functionality of a single optical detector leads to all values in exactly one column and all values in exactly one row deviating significantly from the corresponding reference value, that is to say deviating by more than the threshold value, with the exception of the ratio of the pulse width of the identified detector signal with itself, which must always remain equal to 1.

By determining, for example, how much or by what value the respective ratio deviates from the reference ratio, the extent of the limitation of the functionality, for example the extent of the contamination, can also be quantified in various embodiments. The more heavily the active surface of an optical detector is contaminated, the fewer photons can be registered correspondingly and the more the pulse width also decreases accordingly. By way of example, in addition to the threshold value, one or more further threshold values can be provided in order to be able to classify the ratio in a corresponding range, in order to be able to quantify the extent of the limitation of the functionality.

According to at least one embodiment, a limited functionality of an optical detector, assigned to the identified detector signal, of the at least two optical detectors is identified, in particular by means of the computing unit. In this context, the assigned optical detector is, in particular, the one that generates the identified detector signal.

According to at least one embodiment, checking the functionality includes identifying a group of the at least two detector signals, that is to say two or more of the at least two detector signals, by means of the computing unit on the basis of the ratios or the normalized ratios, with the ratio of each pair containing a detector signal from the identified group and a detector signal which is not part of the identified group deviating by at least one predefined threshold value from an associated predefined reference ratio.

The ratios of two detector signals both belonging to the identified group are in particular approximately equal to 1, assuming the corresponding normalization, that is to say they deviate from the corresponding reference ratio by less than the predefined threshold value.

In the image of the matrix sketched above, this means that for a number of columns corresponding to the size of the group and for a corresponding number of rows there is a respective deviation by more than the threshold value, except for the area in which the rows and columns intersect. Depending on the definition of the matrix, consecutive columns or rows, for example, can reflect the group in this context.

According to at least one embodiment, a limited functionality of a light source, assigned to the identified group, of the transmitter unit is identified, in particular by means of the computing unit.

Such an analysis lends itself in particular to the case where the transmitter unit contains two or more light sources, in particular laser diodes, with each light source being assigned to a group of optical detectors and hence also to a group of detector signals. The optical detectors assigned to the corresponding light source only detect reflected or scattered components of laser signals or test signals of the assigned light source in the process, and no corresponding components of the further light sources. By way of example, this can be realized by a clocked and time-offset emission of the various laser signals by different light sources.

Such a design allows a particularly large number of optical detectors to be used without having to excessively increase the individual optical output power of a light source. The increased number of optical detectors in turn allows the field of view of the laser scanner, that is to say its detection angle range, to be increased.

If an individual light source now has a limited functionality, for example as a result of contamination, then this has an approximately equally strong effect on the number of photons received by all assigned optical detectors. However, the limitation of this light source does not affect the non-assigned detectors. Here, too, the assumption can be made with high reliability that only one light source of the two or more light sources is significantly impaired. Accordingly, the size of the group of the identified detector signals is equal to the number of optical detectors assigned to the correspondingly limited light source.

According to at least one embodiment, the transmitter unit contains two or more light sources, in particular laser light sources or laser diodes. Each of the at least two light sources is assigned one or more of the at least two optical detectors, preferably at least two optical detectors are assigned to each of the light sources.

For example, the number of the at least two optical detectors can correspond to an integer multiple of the number of the at least two light sources, with the result that the same number of optical detectors can be assigned to a light source.

According to at least one embodiment, the transmitter unit includes $N_L$ light sources and $N_L*M$ optical detectors, where M is the number of optical detectors assigned to one of the light sources.

If M columns and M rows of the matrix are affected in the manner described above, it is possible to assume that the corresponding light source has limited functionality or is contaminated.

According to the improved concept, a laser scanner device having a computing unit and a laser scanner is also specified. The laser scanner has a housing with a light-transmissive window and a transmitter unit for emitting laser signals which is arranged within the housing. The laser scanner has a control unit and a movable deflection unit for deflecting the laser signals, and a detector unit which is arranged within the housing and has two or more optical detectors. The control unit is configured to drive the transmitter unit to transmit at least one test signal during a test phase. The control unit is also configured to drive the deflection unit in such a way that the deflection unit is aligned vis-à-vis the transmitter unit during the test phase so that the at least one test signal is not directed at the window. The at least two optical detectors are configured to record reflected and/or scattered components of the at least one test signal and to generate at least two detector signals on the basis of the detected components. The computing unit is configured to determine a pulse width for each of the at least two detector signals and to determine a ratio of the pulse width of a first detector signal of the at least two detector signals to the pulse width of a second detector signal of the at least two detector signals. The computing unit is configured to check a functionality of the transmitter unit and/or detector unit on the basis of the ratio.

The computing unit can be part of the laser scanner in this case, or be provided separately therefrom. If the laser scanner device is provided for use in or on a motor vehicle, then the computing unit can be implemented, for example, as an electronic controller of the motor vehicle. The control unit can optionally also be part of the computing unit. In particular, described functions or tasks of the computing unit can be performed by the control unit in various embodiments, or vice versa.

According to at least one embodiment of the laser scanner device, the deflection unit contains a rotatable or pivotable mirror or a microelectromechanical mirror system, that is to say a mirror which is designed as a microelectromechanical system, MEMS.

In particular, the control unit can drive the deflection unit during the test phase in such a way that test signals correspondingly emitted by the transmitter unit either do not impinge on a reflective surface of the deflection unit, in particular of the mirror, or are deflected by the reflective surface into a region within the housing that does not correspond to the window.

In various embodiments, the pivotable or rotatable mirror contains a mirror body, which in particular can have a substantially cuboid form, with a reflective surface being located on one side face of the cuboid. In various configurations, a further reflective surface can be arranged on a side of the cuboid opposite to the reflective surface. The mirror body is mounted so as to be rotatable or pivotable about an axis of rotation, which in particular passes through two further opposite side faces of the cuboid. The two remaining side faces of the cuboid, which therefore correspond neither to a reflective surface nor to a side face through which the axis of rotation passes, can be referred to as end faces, for example.

In various embodiments, the control unit is configured to drive the deflection unit during the test phase in such a way that the emitted test signals impinge on one of the end faces.

According to at least one embodiment, the transmitter unit has at least two light sources, with each light source of the at least two light sources being assigned to at least one optical detector of the at least two optical detectors, and each optical detector of the at least two optical detectors is assigned to exactly one light source of the at least two light sources.

In this context, reference is made to the corresponding statements on the method according to the improved concept.

According to at least one embodiment, the control unit is configured to drive the transmitter unit in such a way that at least two light sources transmit respective test signals of the at least one test signal with a time offset.

In other words, the at least one test signal contains one test signal per light source. Test signals from different light sources are emitted with a time offset to one another, with the result that they do not overlap in time and accordingly only reflected components of a defined light source can be detected by the at least two optical detectors at any given time.

According to at least one embodiment, the computing unit is configured to determine a ratio of the pulse widths of the detector signals of a respective pair to one another for each pair of detector signals of the at least two detector signals and to check the functionality on the basis of the ratios of the pairs of detector signals.

According to at least one embodiment, the computing unit is configured to identify one of the at least two detector signals, in particular exactly one of the at least two detector signals, on the basis of the ratios, with the ratio of each pair containing the identified detector signal deviating by at least one predefined first threshold value from an associated predefined reference ratio.

According to at least one embodiment, the computing unit is configured to identify a group of the at least two detector signals on the basis of the ratios, with the ratio of each pair containing a detector signal from the identified group and a detector signal which is not part of the identified group deviating by at least one predefined second threshold value from an associated predefined reference ratio.

Further embodiments of the laser scanner device follow directly from the different configurations of the ratio according to the improved concept, and vice versa. In particular, a laser scanner device according to the improved concept may be configured or programmed to carry out a method according to the improved concept, or the laser scanner device carries out such a method.

According to the improved concept, a motor vehicle containing an embodiment of a laser scanner device according to the improved concept is also specified.

A computer program having instructions is also specified according to the improved concept. When the instructions or the computer program are executed by a laser scanner device according to the improved concept, the instructions cause the laser scanner device to carry out a method according to the improved concept.

According to the improved concept, a computer-readable storage medium which stores a computer program according to the improved concept is also specified.

Computer programs and computer-readable storage media according to the improved concept can be referred to as respective computer program products with the instructions.

Further features of the invention are evident from the claims, the figures, and the description of the figures. The features and combinations of features mentioned above in the description and the features and combinations of features mentioned below in the description of the figures and/or shown in the figures alone can be included in the improved concept not only in the combination specified in each case, but also in other combinations. Thus, those embodiments of the improved concept which are not explicitly shown and/or explained in the figures, but emerge and can be produced from the explained embodiments by virtue of separate combinations of features, are also included and disclosed. Thus, in particular, embodiments and combinations of features which do not have all the features of an originally worded claim are also included and disclosed. Furthermore, embodiments and combinations of features which go beyond or differ from the combinations of features set out in the back-references of the claims are included and disclosed.

Figure 4:
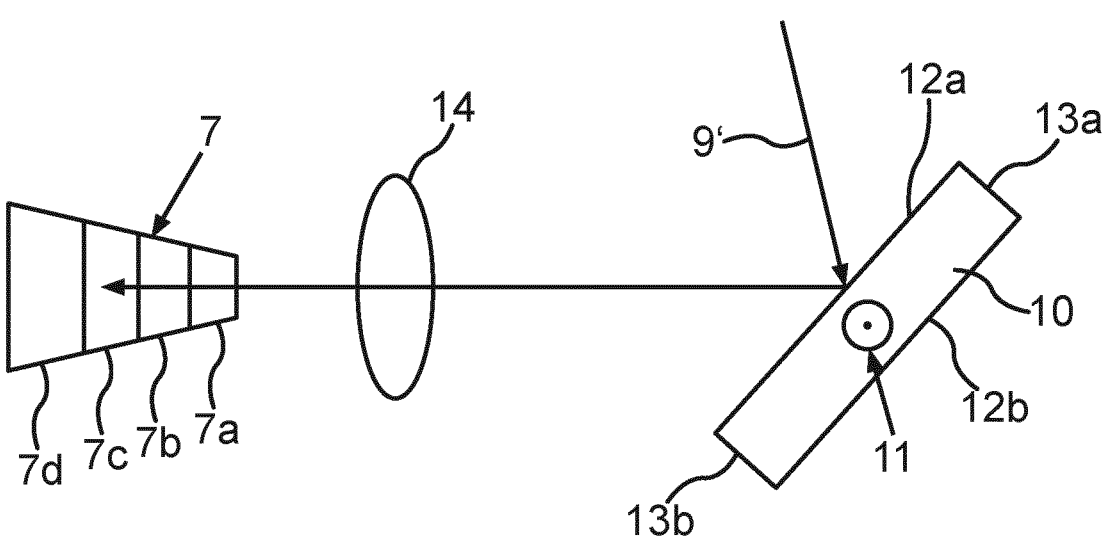

FIG. 4 schematically shows a part of a further exemplary embodiment of a laser scanner device according to the improved concept in a scanning phase;

FIG. 5 shows a schematic illustration of a further exemplary embodiment of a laser scanner device according to the improved concept in a test phase;

FIG. 6*a* shows a schematic illustration of pulse widths; and

FIG. 6*b* shows a further schematic illustration of pulse widths.

Figure 1:
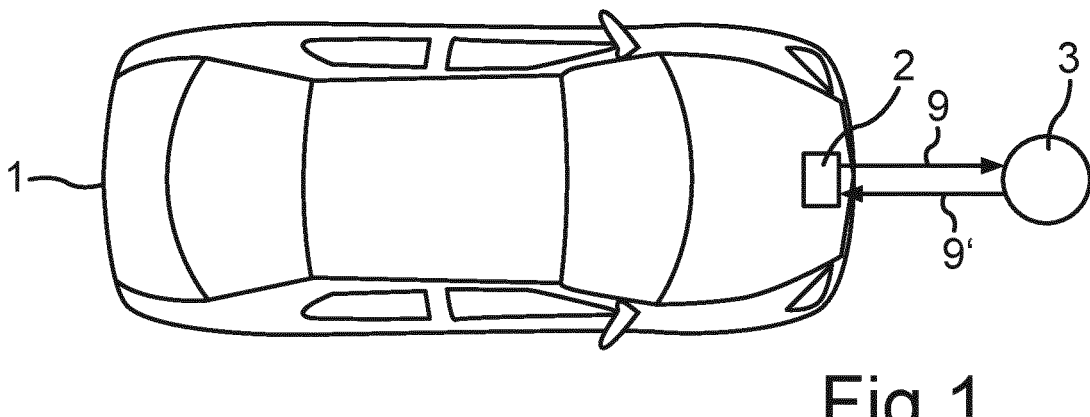
FIG. 1 shows a schematic illustration of a motor vehicle with an exemplary embodiment of a laser scanner device according to the improved concept.

FIG. 1 schematically depicts an exemplary embodiment of a motor vehicle 1 according to the improved concept. The motor vehicle 1 contains a laser scanner device 2 according to an exemplary embodiment according to the improved concept. The laser scanner device 2 can emit laser signals 9 into a surround of the motor vehicle 1 and detect components 9' of the laser signals reflected by an object 3 in the surround. The laser scanner device 2 can determine a position and/or distance of the object 3 from the laser scanner device 2 on the basis of the detected reflected components 9'. This can be implemented, for example, on the basis of the concept of the time-of-flight (TOF) measurement.

Figure 2:
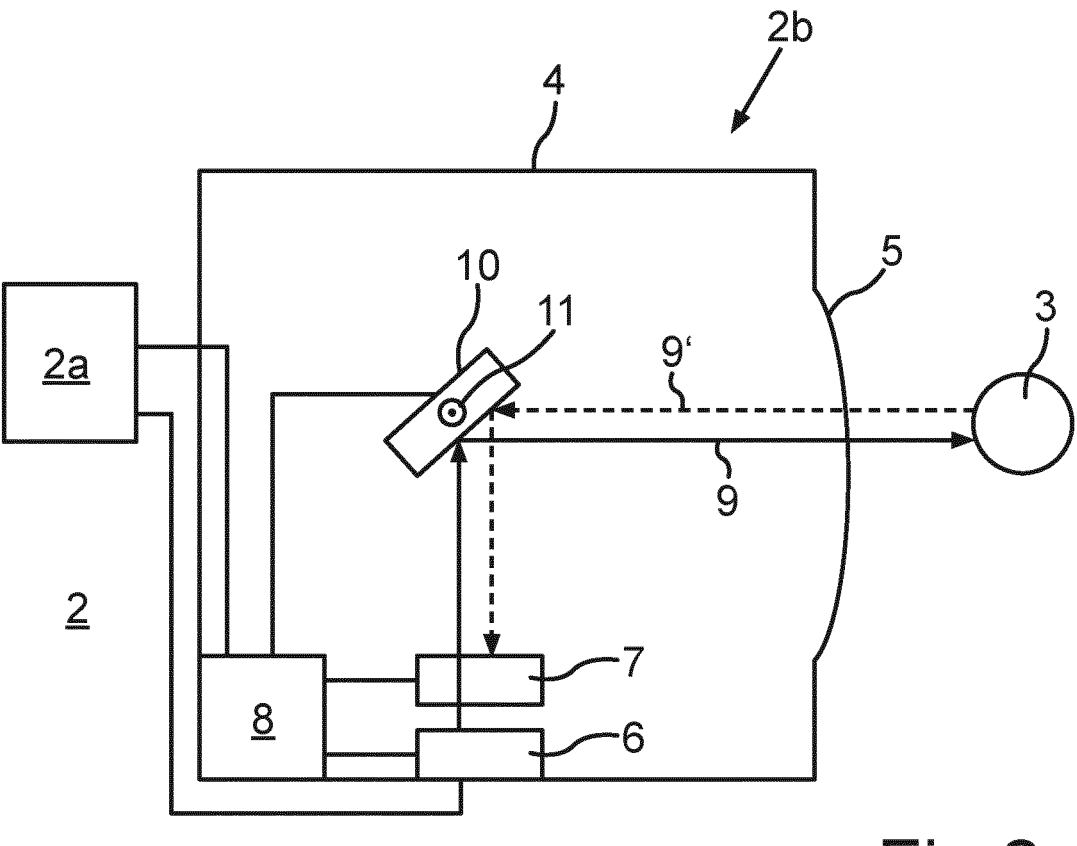
FIG. 2 shows a schematic illustration of a further exemplary embodiment of a laser scanner device according to the improved concept.

FIG. 2 schematically shows a block diagram of an exemplary embodiment of a laser scanner device 2, for example the laser scanner device 2 of the motor vehicle 1 from FIG. 1. The laser scanner device 2 has a laser scanner 2*b* and a computing unit 2*a* which is connected to the laser scanner 2*b* and which can be in the form of an electronic controller of the motor vehicle 1, for example. The laser scanner 2*b* has a housing 4 with a light-transmissive window 5 and a transmitter unit 6 for emitting the laser signals 9 which is arranged within the housing 4, said laser signals being emitted through the light-transmissive window 5. The laser scanner 2*b* contains a control unit 8, which is connected to the computing unit 2*a* and to the transmitter unit 6 in order to drive the latter in order to emit the laser signals 9. The laser scanner 2*b* also contains a detector unit 7 with at least two optical detectors, which are designed in particular as photodiodes, for example as APDs. The transmitter unit 6 contains at least one light source, in particular a laser source, for example at least one infrared laser diode.

The detector unit 7 can detect the reflected components 9' of the laser signals 9, and on the basis thereof each of the at least two optical detectors can generate a corresponding detector signal and transmit the latter to the control unit 8 and/or the computing unit 2*a*.

The laser scanner 2*b* also contains a deflection unit which can have, for example, a mirror rotatably mounted about an axis of rotation 11. In FIG. 2, the axis of rotation 11 is perpendicular to the plane of the drawing. The deflection unit is likewise connected to the control unit 8 and the control unit 8 can accordingly drive the deflection unit so that the mirror 10 is rotated about the axis of rotation 11. The emission angle of the laser signals 9 can thus be varied by the rotation of the mirror 10. A reception path for the reflected components 9' of the laser signals 9 reflected by the object 3, for example, leads via the mirror 10 to the detector unit 7, in particular to an active surface of one of the optical detectors. The reflected components 9' are then recorded by the corresponding optical detector, and so, by rotating the mirror 10 about the axis of rotation 11, each of the optical detectors can detect reflected components 9', incident from different directions, of the laser signals 9. The instantaneous position of the mirror 10 can be determined, for example, via a rotary encoder (not shown) coupled to the axis of rotation 11 or a corresponding shaft.

Since the instantaneous position of the mirror 10 is known for example at every point in time, a set of scanning points, which is also referred to as point cloud, can be generated by way of the temporal sequence of the detected reflected components 9'. In this case, a subset of the scanning points or point cloud is generated by means of each optical detector. A subset of scanning points generated by means of one of the optical detectors can also be referred to as the location of scanning points.

Figure 3:
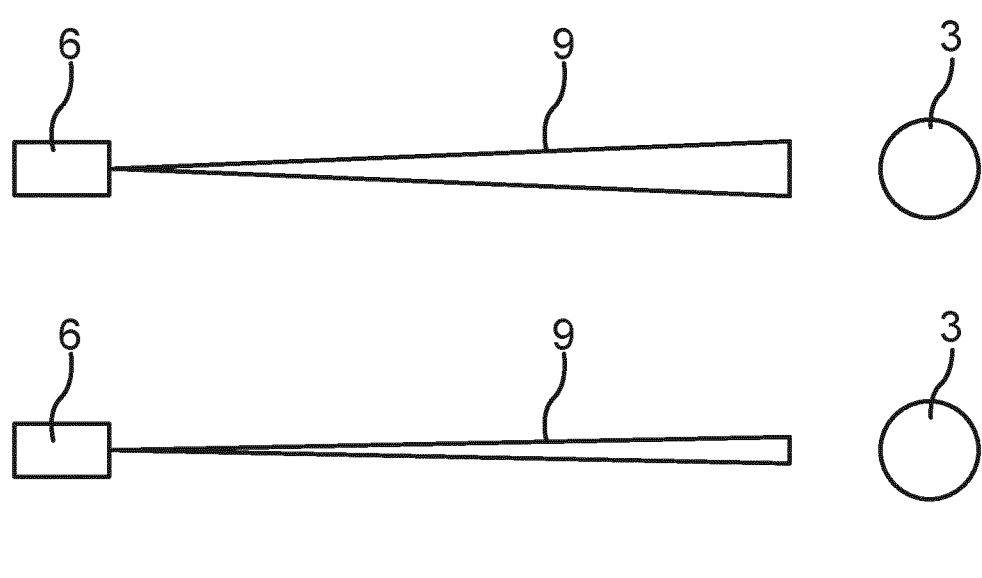
FIG. 3 shows schematic illustrations of a transmitter unit of a further exemplary embodiment of a laser scanner device according to the improved concept.

FIG. 3 schematically shows the transmitter unit 6 of the laser scanner 2b from FIG. 2, and also the laser signals 9 and the object 3. The upper illustration in FIG. 3 corresponds, for example, to a side view, that is to say a view looking in the direction perpendicular to the axis of rotation of the mirror 10. The lower illustration in FIG. 3 corresponds, for example, to a plan view of the transmitter unit 6, that is to say a view looking in the direction parallel to the axis of rotation of the mirror 10. As is evident from the illustrations in FIG. 3, a respective beam expansion of the laser signals 9 can be different in different planes.

FIG. 4 once again schematically depicts the detector unit 7 and the mirror 10 of the laser scanner 2b of FIG. 2, with the reception path of the reflected components 9' being indicated. Optionally, the laser scanner 2b can have a lens arrangement 14 for beam guidance arranged in the reception path for the reflected components 9'.

The example of FIG. 4 depicts four optical detectors 7a, 7b, 7c, 7d of the detector unit 7, which are arranged linearly next to one another, for example. By way of example, the transmitter unit 6 can have two or more light sources, with each light source being assigned two or more of the optical detectors 7a, 7b, 7c, 7d.

In FIG. 4, the mirror 10 has an approximately or substantially cuboid mirror body. However, the side faces of the mirror body need not necessarily be planes but can also be curved, for example. The mirror 10 has, for example, two opposite reflective sides 12a, 12b arranged parallel to the axis of rotation 11. Two non-reflective end faces 13a, 13b of the mirror body are arranged perpendicularly to the reflective sides 12a, 12b and likewise parallel to the axis of rotation 11.

In FIG. 4, the laser scanner 2b is depicted during a scanning phase, for example. The transmitter unit 6 emits the laser signals 9 which are incident on one of the reflective surfaces 12a, 12b and, as also depicted schematically in FIG. 2, are steered to the window 5 by the deflection unit such that said laser signals can leave the housing 4. The reflected components 9' are likewise incident on the reflective surface 12a, 12b and are accordingly deflected to the detector unit 7.

In FIG. 5, the laser scanner 2b is depicted during a test phase. During the test phase, the mirror 10 is aligned vis-à-vis the transmitter unit 6 in such a way that the test signals 15 emitted during the test phase are incident on one of the end faces 13a, 13b and are accordingly not steered in the direction of the window 5 but instead are reflected or scattered multiple times within the housing 4. The components 15' of the test signal 15 which are accordingly reflected and scattered multiple times are incident in turn on the active surfaces of the optical detectors 7a, 7b, 7c, 7d, which generate corresponding detector signals on the basis thereof and transmit said detector signals to the computing unit. The computing unit 2a then determines a corresponding pulse width, which can also be referred to as the echo pulse width, EPW, for each of the detector signals. The computing unit 2a also calculates a corresponding ratio of the pulse widths for each pair of detector signals and compares this ratio with a corresponding respective predetermined reference value, for example by forming a quotient. The corresponding quotients can be represented or stored in the form of a matrix, for example. For example, the structure of the matrix is then as follows:

| | | | |
|---|---|---|---|
| $EPW_1/$ | $EPW_1/$ | $EPW_1/$ | $EPW_1/$ |
| $EPW_1/R_{11}$ | $EPW_2/R_{12}$ | $EPW_3/R_{13}$ | $EPW_4/R_{14}$ |
| $EPW_2/$ | $EPW_2/$ | $EPW_2/$ | $EPW_2/$ |
| $EPW_1/R_{21}$ | $EPW_2/R_{22}$ | $EPW_3/R_{23}$ | $EPW_4/R_{24}$ |
| $EPW_3/$ | $EPW_3/$ | $EPW_3/$ | $EPW_3/$ |
| $EPW_1/R_{31}$ | $EPW_2/R_{32}$ | $EPW_3/R_{33}$ | $EPW_4/R_{34}$ |
| $EPW_4/$ | $EPW_4/$ | $EPW_4/$ | $EPW_4/$ |
| $EPW_1/R_{41}$ | $EPW_2/R_{42}$ | $EPW_3/R_{43}$ | $EPW_4/R_{44}$ |

In this case, $EPW_i$ with $i=1, \ldots, 4$ denotes the pulse width of the corresponding detector signal. $R_{ij}$ with $i=1, \ldots, 4$ and $j=1, \ldots, 4$ denotes the reference ratio of the corresponding pair.

In the present example, the laser scanner 2b has a detector unit 7 with four optical detectors 7a, 7b, 7c, 7d and a transmitter unit 6 with two light sources, with each of the light sources being assigned to two of the optical detectors 7a, 7b, 7c, 7d.

On the basis of the ratios of the pulse widths, the computing unit 2a can now check the functionality of the transmitter unit 6 and/or detector unit 7, in particular determine a limitation of the functionality, for example as a result of a corresponding contamination of the light sources or optical detectors 7a, 7b, 7c, 7d. If there is no contamination or limitation of the transmitter unit or the detector unit 7, then the ratios are, for example, all equal to the corresponding reference ratio, or the normalized ratios are equal to 1. By way of example, if the active surface of a single optical detector is contaminated, then a matrix structure for the normalized ratios is for example as follows:

| | | | |
|---|---|---|---|
| 1 | 1 | >1 | 1 |
| 1 | 1 | >1 | 1 |
| <1 | <1 | 1 | <1 |
| 1 | 1 | >1 | 1 |

In this exemplary example, the values in the third column are greater than 1, except for the entry for (i, j)=(3, 3), and the values in the third row are correspondingly less than 1. From this, it is possible to deduce that the pulse width of the third detector signal is reduced in comparison with all other pulse widths, which in turn indicates a contamination of the corresponding optical detector.

By contrast, if one of the light sources of the transmitter unit 6 is contaminated and said light source is assigned to a plurality of optical detectors, then the following exemplary structure of the matrix emerges:

| | | | |
|---|---|---|---|
| 1 | 1 | >1 | >1 |
| 1 | 1 | >1 | >1 |
| <1 | <1 | 1 | 1 |
| <1 | <1 | 1 | 1 |

In this exemplary example, the values of columns 3 and 4 are each greater than 1 and those of rows 3 and 4 are each less than 1, with the exception of those entries for (i, j)=(3, 3), (4, 3), (3, 4), and (4, 4). This now indicates that the pulse widths of the third and fourth detector signal are reduced in comparison with the other pulse widths. Since experience has shown that it is very unlikely that two optical detectors are contaminated, such a signature of the matrix indicates that the light source of the transmitter unit 6 assigned to the optical detectors which generate the third and the fourth detector signal is contaminated.

The situation of a contaminated light source is also illustrated in FIGS. 6*a* and 6*b*. In this example, the laser scanner 2*b* has a detector unit 7 with 16 optical detectors 7*a*, 7*b*, 7*c*, 7*d* and a transmitter unit 6 with four light sources, with each of the light sources being assigned to four of the optical detectors 7*a*, 7*b*, 7*c*, 7*d*.

FIG. 6*a* schematically shows on the ordinate the value of the pulse widths for the detector signals of the various optical detectors 7*a*, 7*b*, 7*c*, 7*d*, with for example 16*a*, 17*a*, 18*a* and 19*a* each representing four pulse widths of corresponding detector signals without any contamination of the light source or optical detectors 7*a*, 7*b*, 7*c*, 7*d*. In FIGS. 6*b*, 16*b*, 17*a*, 18*b*, and 19*b* correspond to the respective pulse widths, with one of the light sources being contaminated. In particular, the light source assigned to the pulse widths 18*b* is contaminated. The pulse widths 18*b* are therefore each reduced vis-à-vis the pulse widths 18*a* from FIG. 6*a*, whereas the remaining pulse widths 16*b*, 17*b*, 19*b* are not reduced vis-à-vis the original pulse widths 16*a*, 17*a*, 19*a*.

As described, in particular with regard to the figures, the improved concept makes it possible to determine specific functional limitations of a laser scanner, in particular due to contamination of light sources or optical detectors of the laser scanner, with greater accuracy. To this end, characteristic patterns or signatures in the ratios of the pulse widths of the individual optical detectors to one another can be analyzed. In various embodiments, the—experimentally well-documented—assumption is made here that the probability of a particle covering more than one light source or the probability of a plurality of optical detectors being covered at the same time is low.

The invention claimed is:

1. A method for checking the function of a laser scanner, the laser scanner comprising a housing with a light-transmissive window, a transmitter unit for emitting laser signals which is arranged within the housing, a movable deflection unit for deflecting the laser signals, and a detector unit arranged within the housing, the method comprising:

transmitting at least one test signal by the transmitter unit during a test phase;

aligning the deflection unit vis-à-vis the transmitter unit during the test phase so that the at least one test signal is not directed at the window;

recording components of the at least one test signal by at least two optical detectors of the detector unit and at least two detector signals are generated on the basis of the detected components;

determining a pulse width by a computing unit for each of the at least two detector signals;

determining a ratio of the pulse width of a first detector signal of the at least two detector signals to the pulse width of a second detector signal of the at least two detector signals by the computing unit; and checking a functionality of the transmitter unit and/or detector unit on the basis of the ratio.

2. The method as claimed in claim 1, further comprising: checking the functionality such that the ratio is compared to a predefined reference ratio by the computing unit; and generating an error signal depending on a result of the comparison.

3. The method as claimed in claim 1, further comprising: determining a ratio of the pulse widths of the detector signals of a respective pair to one another by the computing unit for each pair of detector signals of the at least two detector signals; and checking the functionality on the basis of the ratios of the pairs of detector signals.

4. The method as claimed in claim 3, wherein one of the at least two detector signals is identified by the computing unit on the basis of the ratios, with the ratio of each pair containing the identified detector signal deviating by at least one predefined threshold value from an associated predefined reference ratio.

5. The method as claimed in claim 4, wherein a limited functionality of an optical detector, assigned to the identified detector signal, of the at least two optical detectors is identified.

6. The method as claimed in claim 3, wherein a group of the at least two detector signals is identified by means of the computing unit on the basis of the ratios, with the ratio of each pair containing a detector signal from the identified group and a detector signal which is not part of the identified group deviating by at least one predefined threshold value from an associated predefined reference ratio.

7. The method as claimed in claim 6, wherein a limited functionality of a light source, assigned to the identified group, of the transmitter unit is identified.

8. A laser scanner device having a computing unit and a laser scanner, wherein;

the laser scanner has a housing with a light-transmissive window, a transmitter unit for emitting laser signals which is arranged within the housing, a control unit, a movable deflection unit for deflecting the laser signals, and a detector unit arranged within the housing;

the control unit is configured to drive the transmitter unit to transmit at least one test signal during a test phase, to drive the deflection unit in such a way that the deflection unit is aligned vis-à-vis the transmitter unit during the test phase so that the at least one test signal is not directed at the window;

the detector unit has at least two optical detectors which are configured to record reflected and/or scattered components of the at least one test signal and to generate at least two detector signals on the basis of the detected components; and the computing unit is configured to determine a pulse width for each of the at least two detector signals;

to determine a ratio of the pulse width of a first detector signal of the at least two detector signals to the pulse width of a second detector signal of the at least two detector signals; and to check a functionality of the transmitter unit and/or detector unit on the basis of the ratio.

9. The laser scanner device as claimed in claim 8, wherein the deflection unit contains a rotatable or pivotable mirror or a microelectromechanical mirror system.

10. The laser scanner device as claimed in claim 8, wherein the transmitter unit has at least two light sources, with each light source of the at least two light sources being assigned to at least one optical detector of the at least two optical detectors; and each optical detector of the at least two optical detectors is assigned to exactly one light source of the at least two light sources.

11. The laser scanner device as claimed in claim 10, wherein the control unit is configured to drive the transmitter unit in such a way that the at least two light sources transmit respective test signals of the at least one test signal with a time offset.

12. The laser scanner device as claimed in claim 8, wherein the computing unit is configured to determine a ratio of the pulse widths of the detector signals of a respective pair to one another for each pair of detector signals of the at least two detector signals and to check the functionality on the basis of the ratios of the pairs of detector signals.

13. The laser scanner device as claimed in claim 12, wherein the computing unit is configured to identify one of the at least two detector signals on the basis of the ratios, with the ratio of each pair containing the identified detector signal deviating by at least one predefined first threshold value from an associated predefined reference ratio; and/or the computing unit is configured to identify a group of the at least two detector signals on the basis of the ratios, with the ratio of each pair containing a detector signal from the identified group and a detector signal which is not part of the identified group deviating by at least one predefined second threshold value from an associated predefined reference ratio.

14. A motor vehicle having a laser scanner device as claimed in claim 8.

15. A computer program product having instructions which cause a laser scanner device as claimed in claim 8, to perform a method for checking the function of a laser scanner, the method comprising:

transmitting at least one test signal by the transmitter unit during a test phase;

aligning the deflection unit vis-à-vis the transmitter unit during the test phase so that the at least one test signal is not directed at the window;

recording components of the at least one test signal by at least two optical detectors of the detector unit and at least two detector signals are generated on the basis of the detected components;

determining a pulse width by a computing unit for each of the at least two detector signals;

determining a ratio of the pulse width of a first detector signal of the at least two detector signals to the pulse width of a second detector signal of the at least two detector signals by the computing unit; and checking a functionality of the transmitter unit and/or detector unit on the basis of the ratio.

* * * * *